United States Patent
Wong

(10) Patent No.: US 9,170,931 B2
(45) Date of Patent: Oct. 27, 2015

(54) PARTITIONING A MEMORY INTO A HIGH AND A LOW PERFORMANCE PARTITIONS

(75) Inventor: Yoon K Wong, Redwood City, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 57 days.

(21) Appl. No.: 13/283,434

(22) Filed: Oct. 27, 2011

(65) Prior Publication Data

US 2013/0111180 A1 May 2, 2013

(51) Int. Cl.
*G06F 12/06* (2006.01)
*G06F 12/02* (2006.01)

(52) U.S. Cl.
CPC .... *G06F 12/0246* (2013.01); *G06F 2212/1016* (2013.01); *G06F 2212/7208* (2013.01); *Y02B 60/1225* (2013.01)

(58) Field of Classification Search
None
See application file for complete search history.

(56) References Cited

U.S. PATENT DOCUMENTS

| | | | |
|---|---|---|---|
| 7,127,560 B2 * | 10/2006 | Cohen et al. | 711/141 |
| 7,136,984 B2 * | 11/2006 | Maiyuran et al. | 711/173 |
| 7,185,168 B2 * | 2/2007 | Rudeseal et al. | 711/173 |
| 2008/0313482 A1 * | 12/2008 | Karlapalem et al. | 713/324 |
| 2010/0057983 A1 * | 3/2010 | Borras et al. | 711/105 |
| 2011/0185208 A1 * | 7/2011 | Iwamoto et al. | 713/323 |
| 2013/0054998 A1 * | 2/2013 | Wyatt et al. | 713/323 |

OTHER PUBLICATIONS

Hall, Chris; "The case for Z-RAM: Q&A with memory specialist Innovative Silicon"; DigiTimes.com; Retrieved from http://www.digitimes.com/bits_chips/a20060328PR202.html; Mar. 2006.*

* cited by examiner

*Primary Examiner* — Christian P Chace
*Assistant Examiner* — Eric Loonan
(74) *Attorney, Agent, or Firm* — Kilpatrick Townsend & Stockton LLP

(57) ABSTRACT

Examples disclose partitioning a volatile memory into a high performance partition and a low performance partition. Further the example discloses retrieving an application with a high performance data and a low performance data from a non-volatile memory to place the high and the low performance data in the high and low performance partitions, respectively. Additionally, the example also discloses receiving a request to decrease power and in response, reduce an amount of power to the high performance partition and maintaining an amount of power provided to the low performance partition.

19 Claims, 7 Drawing Sheets

PARTITIONING A MEMORY INTO A HIGH AND A LOW PERFORMANCE PARTITIONS

BACKGROUND

Applications on computing devices have become numerous in the last several years. However, the computing devices have limited capabilities to efficiently run these applications. Applications may contain data such as graphics which requires greater bandwidth usage. Using more bandwidth, also increases power consumption. Increased power consumption may also lead to power depletion on the computing device. Further, decreasing power capabilities may increase the memory capacity, but this limits the bandwidth usage and is much more costly.

BRIEF DESCRIPTION OF THE DRAWINGS

In the accompanying drawings, like numerals refer to like components or blocks. The following detailed description references the drawings, wherein.

DETAILED DESCRIPTION

Performing higher or greater bandwidth operations causes higher power consumption on computing devices. Switching to lower power consumption memory components limits the bandwidth operations and is more costly.

To address these issues, various examples disclosed herein provide for partitioning a memory into a high performance partition and a low performance partition to decrease cost and power consumption. In one example embodiment, a computing device partitions a volatile memory into a high performance partition and a low performance partition. The computing device retrieves an application from a non-volatile memory to place a high performance data and a low performance data in the high and low performance partitions, respectively. Further, in response to receiving a request to decrease power, the computing device reduces an amount of power to the high performance partition and yet maintains the power provided to the low performance partition. In another example embodiment, the computing device also copies the high performance data to the low performance partition. In a further example embodiment, the computing device receives a request to increase power and as such restores the high performance data to the high performance partition from the low performance partition or the non-volatile memory. In yet a further example embodiment, the computing device identifies a frame with visual data from the high performance data and stores the frame in the low performance partition to display.

In applying the example system and method illustrated herein, reducing power to the high performance partition, the computing device responds in a dynamic manner to save power and efficiently run applications. Further, by identifying a frame with visual data from the high performance data to store in the low performance partition allows the frame to be readily available to display on the computing device. Partitioning the volatile memory also structures the high and low performance partitions based on different memory architectures and/or according to designated capabilities.

Figure 1:
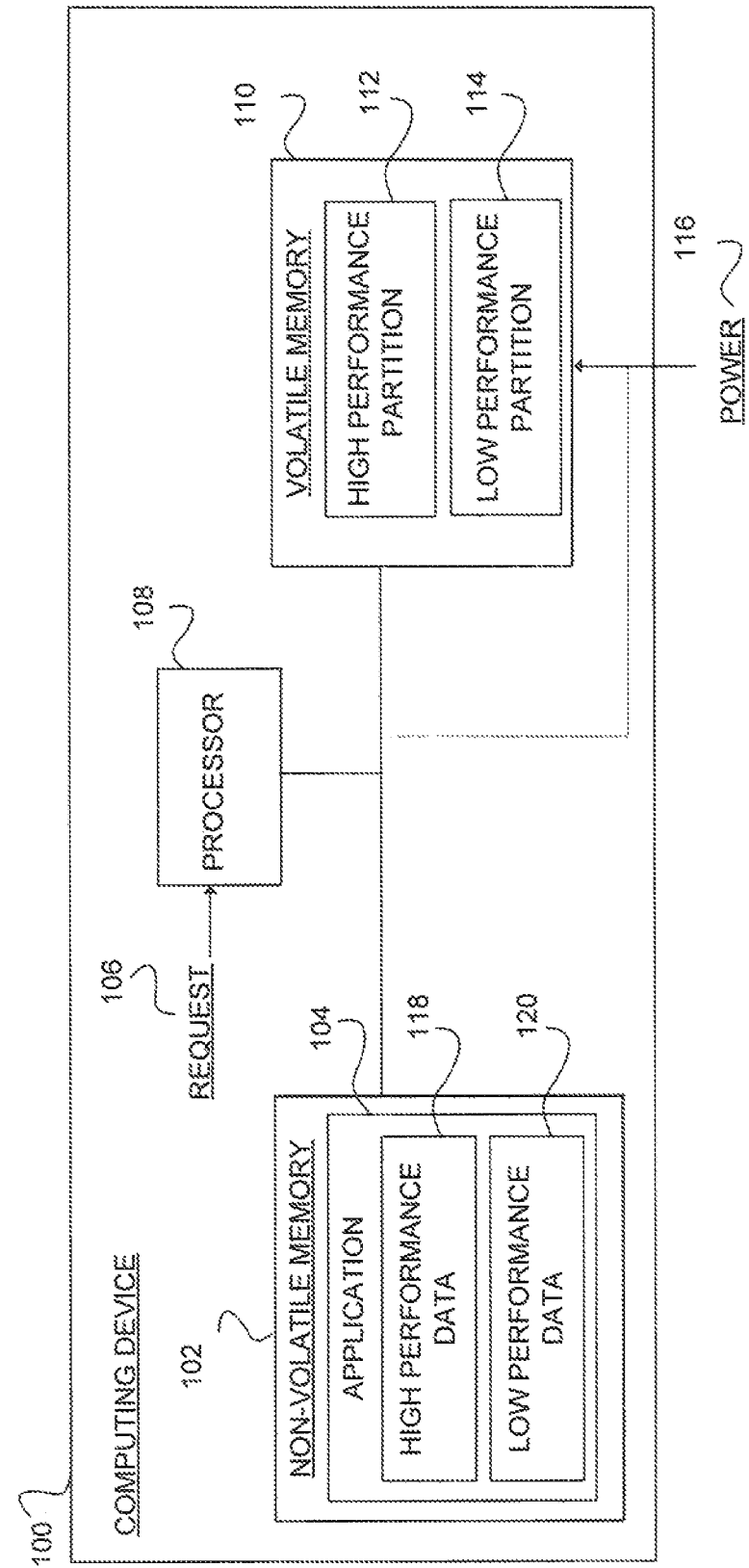
FIG. 1 is a block diagram of an example computing device for partitioning a volatile memory into a high performance partition and a low performance partition.

Referring now to the drawings, FIG. 1 is a block diagram of an example computing device 100 including a processor 108, a non-volatile memory 102, and a volatile memory 110. Example embodiments of the computing device 100 include a client device, personal computer, desktop computer, laptop, a mobile device, portable device, or other computing device suitable to include components 102, 108, and 110. Further it is to be understood although the computing device 100 includes the depicted components, it should not be limited to containing the components in FIG. 1. For example, the computing device 100 may contain an additional processor such as a graphics processing unit and/or additional memory, etc. In a further example embodiment, the computing device 100 includes a display, screen, or monitor for visual display.

The non-volatile memory 102 includes an application 104. Specifically, the non-volatile memory 102 is a computer memory that does not need power 116 to maintain the application 104. Example embodiments of the non-volatile memory 102 include a non-volatile storage, read-only memory (ROM), flash memory, ferroelectric random access memory (RAM), hard disk, floppy disk, magnetic tape, optical disk, hard drive, magnetoresistive random access memory (MRAM), nanodrive, or other suitable component to maintain the application 104. Additionally, although FIG. 1 depicts non-volatile memory 102 comprising application 104, it should not be limited to this example embodiment as there may be multiple applications on the non-volatile memory 102.

The application 104 includes a high performance data 118 and a low performance data 120. Example embodiments of the application 104 include software, program, instructions, procedures, or algorithm to help the computing device 100 to perform a task. Further example embodiments of the application 104 include all related data files required for the application to operate, such as the graphics, media, configurable files, executable files, libraries, etc.

Bandwidth is the rate in which data is transferred. A file that consists of a larger bit size may use a greater bandwidth to transfer and requires more power 116. The high performance data 118 includes the data of the application 104 which requires a greater amount of bandwidth relative to the low performance data 120 since the high performance data 118 includes larger bit size data, such as graphics, media, or computations and thus requires more power 116. Example embodiments of the high performance data 118 include graphics, media, computations, database operations, or other type of application data that requires higher or greater amounts of bandwidth relative to the low performance data 120. The low performance data 120 is the data of the application 104 which does not require as much bandwidth as the high performance data 118. For example, the low performance data 120 is data smaller in size than the high performance data 118 and as such may use a smaller bandwidth and requires less power 116 than the high performance data 118. Example embodiments of the low performance data 120 include source code, configurable file, executable file, library, or other sort of data that comprises an application 104. For example, the application 104 may include a gaming application and the high performance data 118 includes the graphics related to the gaming application and the low performance data 120 includes the source code required for the gaming application to operate.

The volatile memory 110 includes a high performance partition 112 and a low performance partition 114. The volatile memory 110 is a type of temporary memory that requires power 116 to maintain stored information. Example embodiments of the volatile memory 110 include random access memory (RAM), volatile storage, dynamic random access memory (DRAM), static random access memory, or other memory suitable to include the high performance partition 112 and the low performance partition 114. Further, although volatile memory 110 is depicted into the high and low performance partitions 112 and 114 embodiments should not be limited to these partitions. For example, the volatile memory 110 may include a third partition, etc. A further example embodiment of the volatile memory 110 includes partitioning into a high power partition and a low power partition, while another example embodiment includes partitioning into a high bandwidth partition and a low bandwidth partition. In a further example embodiment, the volatile memory 110 may also include a power controller to manage or control the power 116 distributed to the high and low performance partitions 112 and 114.

The high performance partition 112 provides a memory area capable of storing higher or greater bandwidth data relative to the low performance partition 114, such as storing the high performance data 118. For example, the high performance partition 112 may be designated for greater bandwidth operations such as graphics or computations as opposed to the low performance partition 114 which may be designated for lower bandwidth data such as source code. Although the high performance partition 112 and the low performance partition 114 appear to be different types of memory architectures, these partitions 112 and 114 may also be part of the volatile memory 110 with similar memory architectures. For example, the high and low performance partitions 112 and 114 may have comparable specifications, such as using the same amount of power. However, a further example embodiment of the high performance partition 112 and the low performance partition 114 includes these partitions 112 and 114 as different types of memory architectures. For example, the high performance partition 112 may be a higher capability bandwidth memory interface such as a three-dimensional integrated circuit memory. The low performance partition 114 may include a low power double date rate dynamic random access memory capable of storing lower bandwidth operations and thus uses a different amount of power 116 than the high performance partition 112.

The low performance partition 114 provides a memory area capable of storing lower bandwidth data relative to the high performance partition 112, such as storing the low performance data 120. For example, the low performance partition 114 may be designated for lower bandwidth data, such as source code. In another example embodiment, the low performance partition 114 uses a different amount of power 116 than the high performance partition 112. Using different amounts of power 116, the high performance partition 112 is considered a different type of memory architecture than the low performance partition 114.

The processor 108 partitions the volatile memory 110 into the high performance partition 112 and the low performance partition 114. Further, the processor 108 fetches or retrieves the application 104 from the non-volatile memory 102 which the application 104 includes the high performance data 118 and the low performance data 120. Additionally, the processor 108 stores or places the high performance data 118 in the high performance partition 112 and the low performance data 120 in the low performance partition 114. The processor 108 may include a central processing unit (CPU), microprocessor, graphics processing unit (GPU), visual processing unit (VPU), or other programmable device suitable to partition a memory, such as a hardware accelerator or on-chip accelerator.

Further still, the processor 108 receives a request 106 to decrease power 116 to the volatile memory 110. Specifically, the request 106 includes decreasing power 116 to the high performance partition 112. Example embodiments of the request 106 include a request to power down the computing device 100, enter a sleep mode, or terminate the application 104. One example embodiment includes the request 106 being placed outside of the computing device 100, such as by a user who may want to terminate the application 104, while another example embodiment depicts the request 106 being placed within the computing device 100, such as from processor 108 as an indication to power down the computing device 100. Further, after the request 106 may be received by the processor 108, the power 116 will be reduced to the high performance partition 112 and the power will be maintained at the low performance partition 114. In another example embodiment, after there is a request 106 to decrease power, the power 116 will be reduced to the high performance partition 112 relative to the low performance partition 114. For example, the power 116 received by the high performance partition 112 will be reduced in comparison to the power 116 received by the low performance partition 114. Further, although FIG. 1 depicts a single communication line between the processor 108 and the volatile memory 120, there may be a communication line from the high performance partition 112 to the processor 108 while there may be an additional communication line from the low performance partition 114 to the processor 108. In this respect, there may be different communication interfaces between the processor 108 and the high and low performance partitions 112 and 114. In a further example embodiment, the processor 108 may communicate with the power 116 or a power controller to reduce the power to the high performance partition 112. In this embodiment, reducing the power 116 to the high performance partition 112 may include turning off at least a portion of the high performance partition 112.

Figure 3:
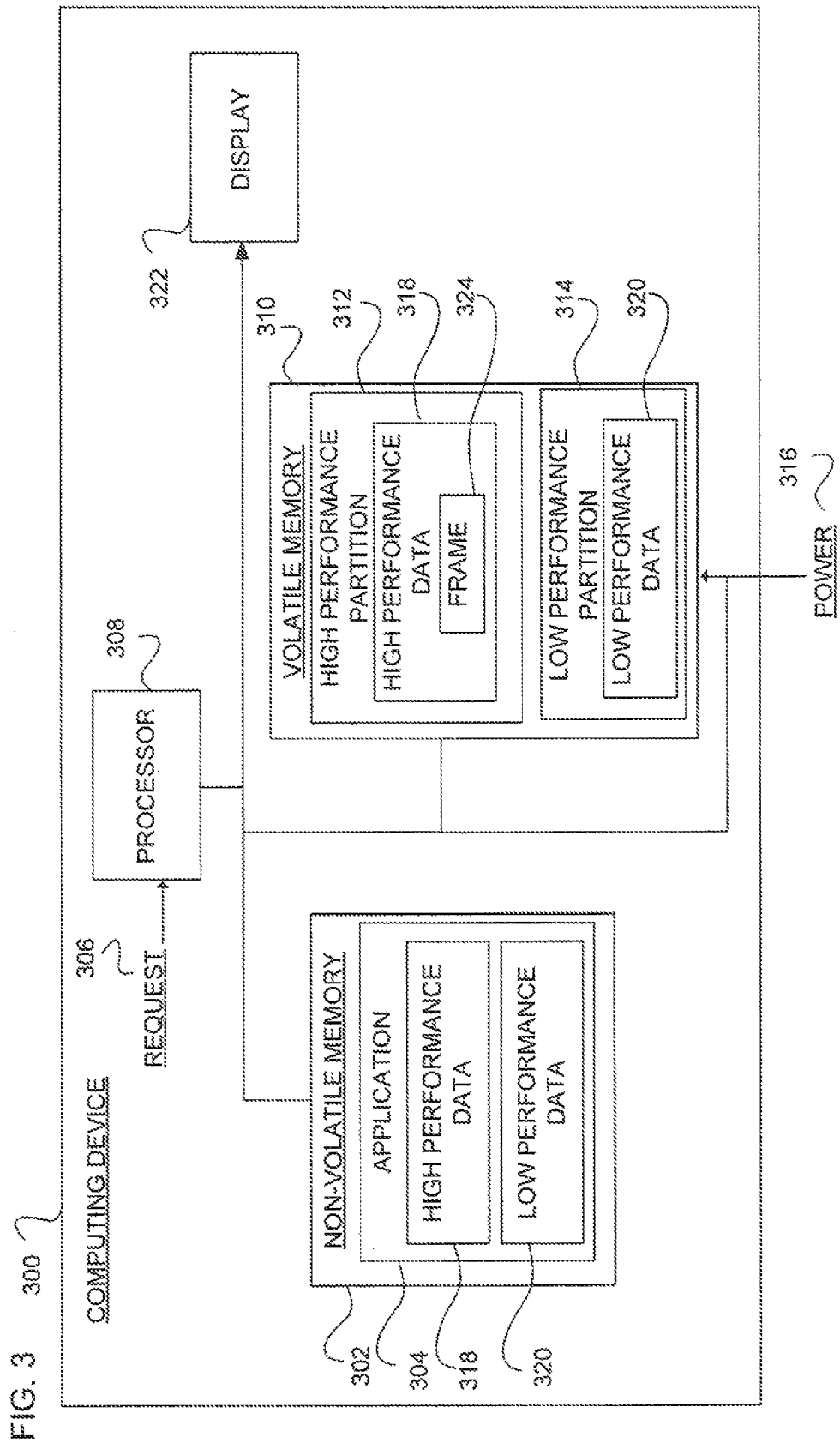
FIG. 3 is a block diagram of an example computing device for identifying a frame to display.

The power 116 supplies power to volatile memory 110. Example embodiments depict the power 116 as being connected to the volatile memory 110 and the processor 108 from outside of the computing device 110, while other example embodiments depict the power 116 being provided from within the computing device 100, such as from a power integrated circuit. Additionally, although FIG. 3 depicts the power 116 as a uniform power provided to both the high performance partition 112 and the low performance partition 114, FIG. 3 should not be limited to this embodiment. For example, assuming the high and the low performance partitions 112 and 114 are different memory architectures, the high performance partition 112 may use a greater amount of power 116 than the low performance partition 114.

Figure 2:
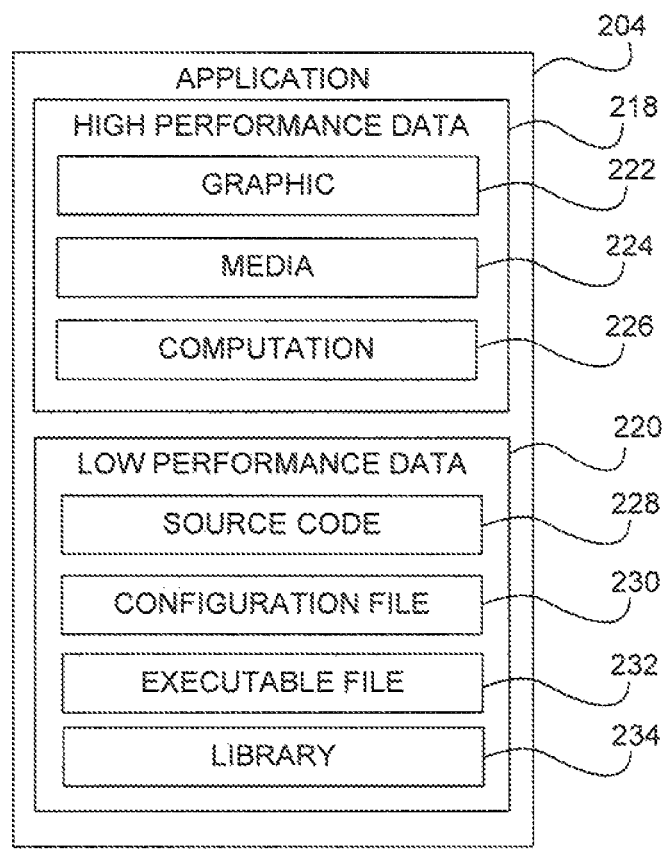
FIG. 2 is a block diagram of an example application including a high performance data and a low performance data.

Turning now to FIG. 2, a block diagram of an example application 204 is depicted including a high performance data 218 and a low performance data 220. The application 204, high and low performance data 218 and 220 include the functionality of the application 104, the high performance data 118 and the low performance data 120 as discussed in FIG. 1. Specifically, FIG. 2 illustrates the high performance data 218 may include at least a graphic 222, a media 224, and/or a computation 226 while the low performance data 220 may include at least a source code 228, a configuration file 230, a executable file 232, and/or a library 234. Additionally, FIG. 2 depicts the application 204 and performance data 218 and 220 irrespective of location, thus the application 204 may be located on the non-volatile memory 102 as in FIG. 1 or the high and low performance data 218 and 220 may be located within the high performance and low performance partitions 112 and 114 on the volatile memory 110.

The application 204 includes the high and low performance data 218 and 220. As discussed earlier, example embodiments of the application 204 include software, program, instructions, procedures, or algorithm for a computing device to perform a task. For example application 104 includes a gaming application, media player, mathematical calculations, office software suite, etc. The high performance data 218 includes the data of the application 204 which requires greater or higher bandwidth relative to the low performance data 220 since it may be a larger data size and as such, uses more power. Example embodiments of the high performance data 218 include at least graphic 222, media 224, and/or computation 226. Additionally, the high performance data 218 may include any one or combination of 222, 224, and 226. The low performance data 220 is the data of the application 204 which does not require as much bandwidth as the high performance data 218. Example embodiments of the low performance data 220 include at least source code 228, configuration file 230, executable file 232, and/or library 234. Additionally, the low performance data 220 may include any one or combination of 228, 230, 232, and/or 234.

For example, the application 204 may include a gaming application which includes graphics and source code. The high performance data 218 would include the graphics related to the gaming application and the low performance data 220 would include the source code.

Referring now to FIG. 3, a block diagram of an example computing device 300 including a processor 308, a non-volatile memory 302, and a volatile memory 310, similar to FIG. 1. However unlike FIG. 1, FIG. 3 depicts a frame 324 from the high performance data 318, low performance data 320 within a low performance partition 314, and a display 322. The computing device 300 includes functionality from the computing device 100 from FIG. 1 as set forth above.

The memories 302 and 310 may include functionalities of the memories 102 and 110 as in set forth above in FIG. 1. Additionally, the non-volatile memory 302 includes an application 304 with a high performance data 318 and a low performance data 320. The application 304, high performance data 318, and low performance data 320 as set forth above in FIG. 1 and FIG. 2 may include the functionalities of: application 102 and 204; high performance data 118 and 218; and low performance data 120 and 220.

The processor 308 partitions the volatile memory 310 into the high performance partition 312 and the low performance partition 314. The processor 308, the high performance partition 318, and the low performance partition 314 includes the functionalities as set forth above in FIG. 1, the processor 108, the high performance partition 112, and the low performance partition 114.

The processor 308 retrieves or fetches the application 304 from the non-volatile memory 302 and stores or places in the volatile memory 319 the high performance data 318 and the low performance data 320. More specifically, the processor 308 stores the high and low performance data 318 and 320 in the high performance partition 312 and the low performance partition 314 of the volatile memory 310, respectively. The processor may receive a request 306 to decrease power 316 and in response, reduces an amount of power 316 to the high performance partition 312. For example, the processor 308 may communicate with the power 316 or a controller on the volatile memory 310 to decrease the power received by the high performance partition 312. The request 306 and the power 316 include functionality of the request 106 and the power 116 as in FIG. 1 set forth above.

The high performance data 318 is stored in the high performance partition 312 within the volatile memory 310. Further, the high performance data 318 includes the frame 324. In one embodiment, the high performance data 318 in the volatile memory 310 includes only a portion of the high performance data 318 in the non-volatile memory 302. In a further embodiment, the high performance data 318 in the non-volatile memory is copied and placed in the high performance partition 312.

The low performance data 320 is stored within the low performance partition 314 on the volatile memory 310.

The frame 324 is identified from the high performance data 318. Specifically, the frame 324 is an image used to compose a graphic on display 322 and as such includes visual data. On example embodiment includes the frame 324 identified from a frame buffer. For example, the high performance data 312 includes several graphics, the frame 324 may include a single graphic which may then be displayed on display 322. In a further example, the frame 324 is identified to store in the low performance partition 314. Identifying the frame 324 from the high performance data enables a smaller portion of the high performance data to be stored and readily available to display on 322.

The display 322 utilizes the identified frame 324 to present the visual data. For example, the identified frame 324 may include a recent displayed image or graphic to a user. Thus, the recent image or graphic may be readily available to show on the display 322 to the user while power 316 is reduced to the high performance partition 312. Example embodiments of the display 322 include a screen, monitor, electronic visual display, display device, or other display suitable to display visual data. In a further example embodiment, the display 322 includes frame buffers to compile the high performance data 318 to create the visual display.

Figure 4:
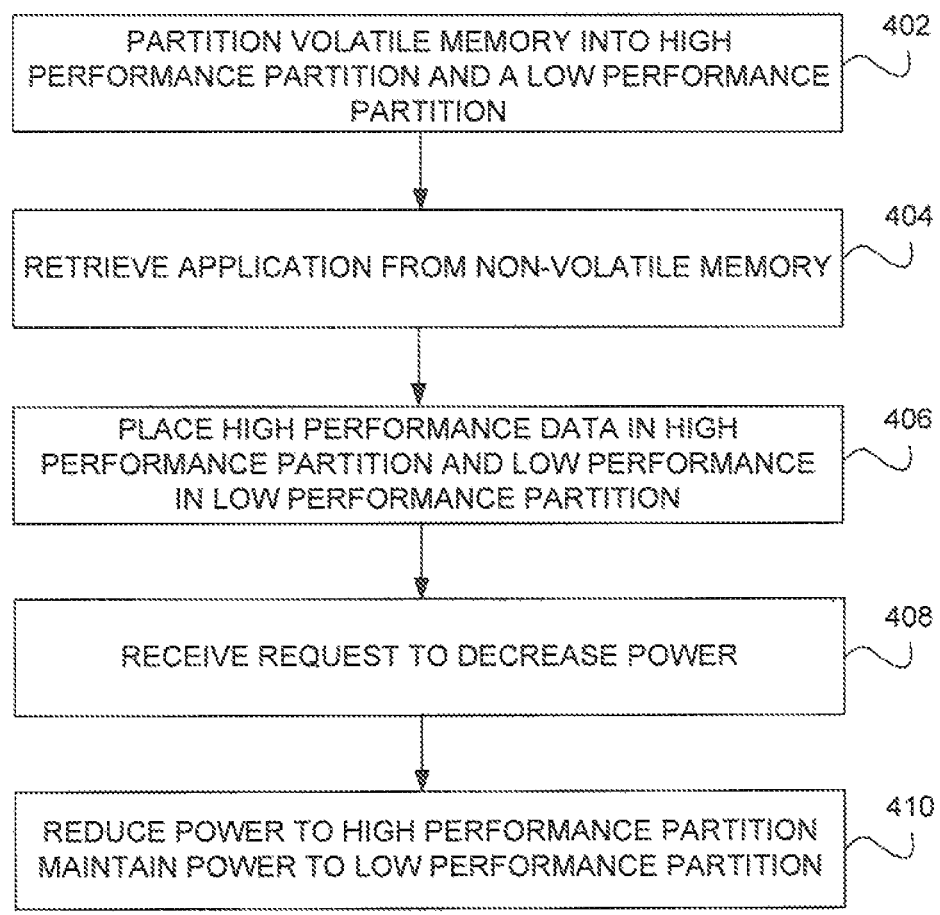
FIG. 4 is a flow chart of an example method for partitioning a volatile memory and reducing power to a high performance partition.

Turning now to FIG. 4, a flowchart of an example method performed on a computing device to partition a volatile memory into a high and a low performance partitions. Although execution of FIG. 4 is described as being performed on computing device 100 as in FIG. 1, it may also be executed on other suitable components as will be apparent to those skilled in the art. For example, FIG. 4 may be implemented in the form of executable instructions on a machine readable storage medium, such as memories 102 and/or 110.

Operation 402 is performed such that a processor operating in conjunction with the computing device may partition a volatile memory into a high performance partition and a low performance partition. One example embodiment of operation 402 includes providing power to the volatile memory to partition into the high and the low performance partitions. Another example embodiment of operation 402 includes configuring the volatile memory into a high and low performance partition. A further example embodiment includes designating a portion of the volatile memory to store greater bandwidth consuming data and designating another portion to store lower bandwidth consuming data. Still another example embodiment includes configuring the high and low performance partition into different memory architectures. For example, the high performance partition may be capable of storing greater bandwidth data, such as a three-dimensional integrated circuit memory and as such may require more power, while the low performance partition may be capable of storing lesser bandwidth data and as such requires less power, such as a low power double data rate dynamic RAM. Thus the high performance partition and the low performance partition are considered a first and a second type of memory architecture. Yet a further example embodiment includes partitioning the volatile memory into a high and low power partition.

At operation 404 the processor retrieves an application from a non-volatile memory. As depicted in earlier figures, the application includes a high performance data and a low performance data. One example embodiment of operation 404 includes copying the application from the non-volatile memory so the high performance data and the low performance data may be stored in the high and the low performance partitions of the volatile memory. A further example embodiment of operation 404 includes loading the application from the non-volatile memory into the volatile memory for execution by the processor. For example, the high performance data may include the graphic frames that may be composited together by the processor to create a picture.

At operation 406 the processor places the high performance data in the high performance partition and the low performance data in the low performance partition on the volatile memory. In one example embodiment, operation 406 includes storing the high and low performance data in the high and low performance partitions, respectively. The application retrieved at operation 404 includes the high performance data and the low performance data. Another example embodiment of operation 406 includes separating the high performance data and the low performance data in the application to place in the high and low performance partitions on the volatile memory.

At operation 408 the processor receives a request to decrease power. Example embodiments of the request to decrease power include requests to power down the computing device, enter a sleep mode, or terminate the application. For example, a user of the computing device may choose to terminate the application and thus this includes a request to decrease power. As a further example, a malfunctioning hardware component may be consuming too much power then a request would be made to decrease power until further diagnosis. In a further example embodiment if no request is received by the processor to decrease power at operation 408, the computing device will continue operation without reducing power at operation 410.

At operation 410 power is reduced to the high performance partition and power is maintained to the low performance partition. One example embodiment of operation 410, includes copying the high performance data in the high performance partition to the low performance partition. Another example embodiment of operation 410 includes removing the high performance data no longer needed for the application. For example, if the high performance data consists of several graphics, not all of these graphics may be needed for the application and thus may be removed. A further example embodiment of operation 410 identifies a frame with visual data from the high performance data and stores the frame in the low performance partition to display. The identified frame may include the visual data on the display or it may include the frame in a frame buffer. In this sense, if there is a response to increase power, such as a user launching the application again, this frame may be displayed while the power is increased to the high performance partition. In a further example embodiment, the computing device may receive a request to increase the power and restore the high performance data. In this embodiment, the high performance data may be retrieved from the low performance partition or the non-volatile memory. Another example embodiment of operation 410 includes copying the high performance data to the low performance partition and removing the high performance data from the high performance partition. Yet, a further example embodiment of operation 410 includes reducing an amount of power to the high performance partition relative to the amount of power to the low performance partition.

Figure 5:
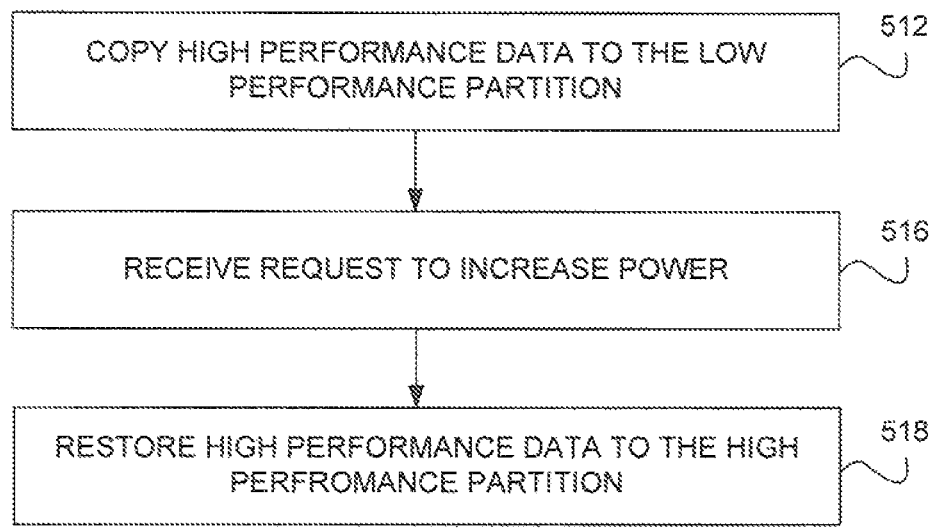
FIG. 5 is a flow chart of an example method for copying a high performance data to a low performance partition.

Referring now to FIG. 5, a flowchart of an example method performed on a computing device for copying a high performance data to a low performance partition. In one example embodiment, FIG. 5 is performed on the computing device 100 as seen in FIG. 1. Although FIG. 5 is described as being performed with reference to the components of FIG. 1, it may also be executed on other suitable components as will be apparent to those skilled in the art. For example, FIG. 5 may be implemented in the form of executable instructions stored on memories 102 or 110 or in the form or electronic circuitry. In another example embodiment, FIG. 5 is performed following the operations 402-410 as seen in FIG. 4. For example, at operation 410 after reducing the power to the high performance partition, the computing device may copy the high performance data to the low performance partition at operation 512.

At operation 512, the computing device copies the high performance data from the high performance partition to the low performance partition. Copying the high performance data allows this data to be readily available to a processor of the computing device in the volatile memory as opposed to the non-volatile memory where it may take longer to fetch the high performance data. In one example embodiment, operation 512 is performed after operation as in FIG. 4. In another example embodiment of operation 512, a smaller portion of the high performance data is copied from the high performance partition to the low performance partition. For example, the high performance data may consist of several frames of graphics and a portion smaller than the several frames may be copied from the high performance partition to the low performance partition. Copying a portion of the high performance data to the low performance partition ensures a portion of the high performance data which may be used frequently will be readily available to the processor to fetch, decode, and/or execute. In a further example embodiment, operation 512 includes removing the high performance data from the high performance partition. Removing the high performance data from the high performance partition ensures less power is consumed. For example, the high performance data may consist of several graphics that utilizes greater bandwidth, thus these graphics consume a larger amount of power and reducing the graphics reduces the amount of power consumed by the computing device. In a further example, a gaming application comprises several graphics, yet not every graphic may be utilized, thus the graphics that are no longer needed may be removed from the high performance partition to reduce power. In additional example, a gaming application may use several graphics such as textural graphics representing objects to create a composited picture, many of these textural graphics may no longer be needed as the composited picture changes within the gaming application and as such are removed from the high performance partition.

At operation 516, the computing device receives a request to increase power. Example embodiments of operation 516 include relaunching an application, turning on the computing device, turning on a display, etc. For example, a user may terminate an application and choose to relaunch it, thus causing a request to increase power.

At operation 518 the computing device restores the high performance data to the high performance partition. The high performance data may be restored from the low performance partition or the non-volatile memory. For example, the high performance data removed at operation 514 may be restored into the high performance partition in response to the request to increase power at operation 516.

Figure 6:
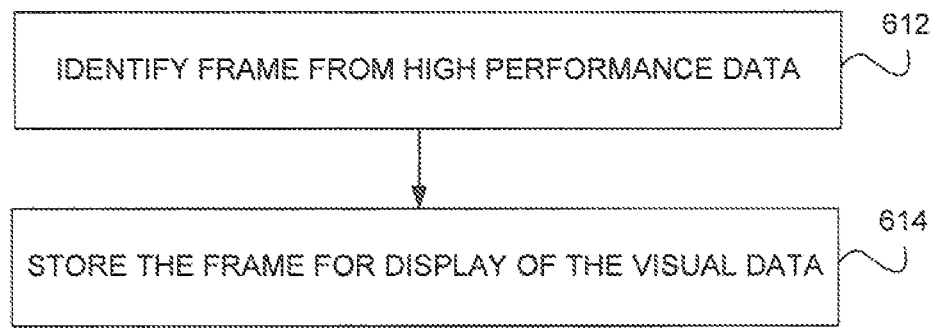
FIG. 6 is a flowchart of an example method for identifying a frame with visual data from a high performance data.

Referring now to FIG. 6, a flowchart of an example method for identifying a frame with visual data from a high performance data. In one example embodiment, FIG. 6 is performed on the computing device 100 as seen in FIG. 1. Although FIG. 6 is described as being performed with reference to the components of FIG. 1, it may also be executed on other suitable components as will be apparent to those skilled in the art. For example, FIG. 6 may be implemented in the form of executable instructions stored on memories 102, 110, or in the form of electronic circuitry. In another example embodiment, the method in FIG. 6 begins after operation 410 as seen in FIG. 4 or concurrently with operation 410. For example, a computing device reduces power to the high performance partition as at operation 410, while also identifying a frame with visual data from the high performance data as at operation 612.

At operation 612, the computing device identifies the frame with visual data from the high performance data. One example embodiment of operation 612 includes identifying the frame from a frame buffer. In another example embodiment, operation 612 includes identifying the frame from a display. Identifying this frame allows it to be readily available for display to a user. In one example embodiment, operation 612 is performed after operation 410 as in FIG. 4, while another example embodiment, operation 612 is performed concurrently with operation 410.

At operation 614 the frame with visual data identified at operation 612 is stored in the low performance partition to display. In one embodiment, operation 612 includes after identifying the frame at operation 612, the high performance data is removed from the high performance partition. For example, the identified frame from a gaming application may include a picture which may be stored in the low performance partition to be readily available in case the visual data in the frame needs to be quickly displayed on the computing device to a user.

Figure 7:
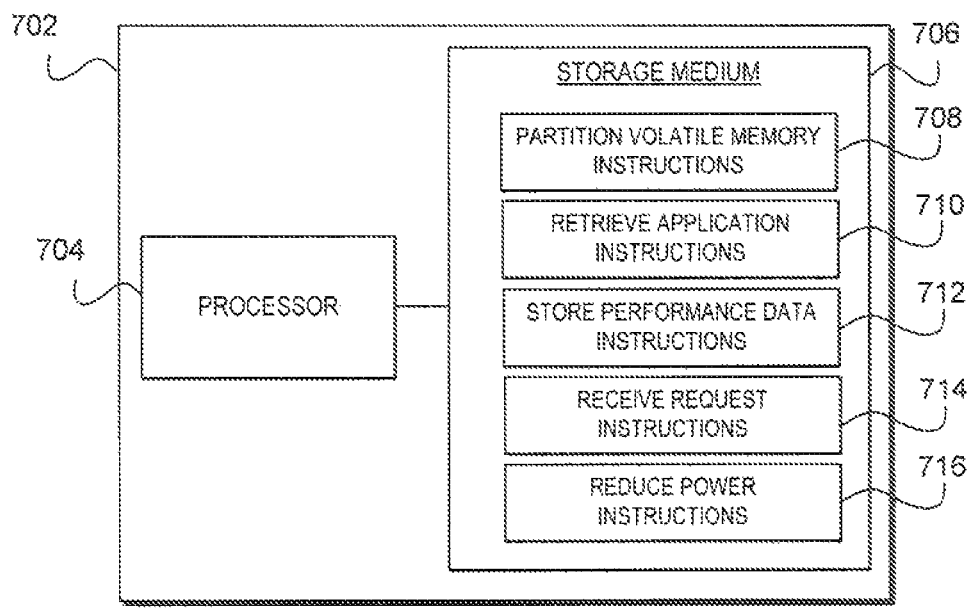
FIG. 7 is a block diagram of an example computing device to partition a volatile memory to reduce power.

Referring now to FIG. 7, a block diagram of an example computing device 702 for partitioning a volatile memory to reduce power. Although computing device 702 includes processor 704 and machine-readable storage medium 706, it may also include other components that would be suitable to one skilled in the art. For example, the computing device 702 may include a non-volatile memory 102 and/or volatile memory 110 as in FIG. 1. Additionally, the computing device 702 includes the functionality of the computing devices 100 and 300 as set forth above in FIG. 1 and FIG. 3.

The processor 704 may fetch, decode, and execute instructions 708, 710, 712, 714, and 716. Processor 704 includes the functionality of the processors 108 and 308 as set forth above in FIG. 1 and FIG. 3. Specifically, the processor 704 executes: partition the volatile memory into a high performance partition and a low performance partition instructions 708; retrieve an application instructions 710, in which the application includes a high performance data and a low performance data; store the high performance data and the low performance data instructions 712 of which the high performance data is stored in the high performance partition and the low performance data is stored in the low performance partition; receive request to decrease power instructions 714; and in response to the request, reduce an amount of power to the high performance partition instructions 716.

The machine-readable storage medium 706 may include instructions 708, 710, 712, 714, and 716 for the processor 704 to fetch, decode, and execute. The machine-readable storage medium 706 may be an electronic, magnetic, optical, memory, flash-drive, or other physical device that contains or stores executable instructions. Thus, the machine-readable storage medium 706 may include for example, Random Access Memory (RAM), an Electrically Erasable Programmable Read-Only memory (EEPROM), a storage drive, a memory cache, network storage, a Compact Disc Read Only Memory (CD-ROM) and the like. As such, the machine-readable storage medium 706 can include an application and/or firmware which can be utilized independently and/or in conjunction with the processor 704 to fetch, decode, and/or execute instructions on the machine-readable storage medium 706. The application and/or firmware can be stored on the machine-readable storage medium 706 and/or stored on another location of the computing device 702.

The embodiments described in detail herein partition a memory into a high performance partition and a low performance partition to store high and low performance data to decrease an amount of power to the high performance partition.

I claim:

1. A method for execution by a computing device comprising:
    partitioning, by the computing device, a volatile memory into a high performance partition and a low performance partition, the high performance partition providing a higher data rate than a data rate of the low performance partition;
    retrieving an application from a non-volatile memory,
    separating data for the application into high performance data and low performance data, wherein:
        a size of each of the high performance data and the low performance data is less than a size of the data for the application, and
        the high performance data includes a portion of the data for the application which requires a greater amount of bandwidth relative to the low performance data;
    placing the high performance data in the high performance partition and the low performance data in the low performance partition;
    receiving a request to decrease power; and
    in response to the decrease power request, reducing an amount of power to the high performance partition and maintaining an amount of power provided to the low performance partition.

2. The method of claim 1, wherein the high performance partition has a first type of memory architecture and the low performance partition has a second type of memory architecture.

3. The method of claim 1, wherein reducing the amount of power to the high performance partition includes: copying the high performance data from the high performance partition to the low performance partition.

4. The method of claim 3, further comprising:
    receiving a request to increase power;
    in response to the increase power request, restoring the high performance data to the high performance partition from the low performance partition.

5. The method of claim 1, further comprising:
    in response to the decrease power request:
        identifying a frame including visual data from the high performance data; and storing the frame from the high performance data in the low performance partition for display of the visual data on a display of the computing device.

6. The method of claim 5, further comprising:
in response to a request to increase power:
increasing an amount of power to the high performance partition to which power was reduced in response to the decrease power request, and
restore the frame from the low performance partition to the high performance partition.

7. The method of claim 1, wherein the decrease power a request to enter a sleep mode or a request to terminate the application.

8. The method of claim 1, wherein the high performance data includes at least one of a graphic, a media, or a computation.

9. The method of claim 1, wherein the low performance data includes at least one of a source code, a configurable file, or an executable file.

10. A computing device comprising:
a non-volatile memory to store an application;
a volatile memory partitioned into a high performance partition and a low performance partition, the high performance partition providing a higher data rate than a data rate of the low performance partition; and
a processor to:
fetch the application from the non-volatile memory,
separate data for the application into high performance data and low performance data, wherein a size of each of the high performance data and the low performance data is less than a size of the data for the application, and the high performance data includes a portion of the data for the application which requires a greater amount of bandwidth relative to the low performance data;
store the high performance data in the high performance partition of the volatile memory and the low performance data in the low performance partition of the volatile memory, and
receiving a request to decrease power; and in response to the decrease power request, reducing an amount of power to the high performance partition and maintaining an amount of power provided to the low performance partition.

11. The computing device of claim 9, wherein the processor is further to:
in response to the decrease power request:
identify a frame including visual data from the high performance data; and
store the frame from the high performance data in the low performance partition to display the visual data on a display of the computing device.

12. The computing device of claim 9, wherein the processor is further to: copy the high performance data from the high performance partition to the low performance partition.

13. A non-transitory machine-readable storage medium encoded with instructions executable by a processor, the instructions executable to:
partition a volatile memory into a high performance partition and a low performance partition, the high performance partition providing a higher data rate than a data rate of the low performance partition;
retrieve an application from a non-volatile memory,
separate data for the application into high performance data and low performance data, wherein:
a size of each of the high performance data and the low performance data is less than a size of the data for the application, and
the high performance data includes a portion of the data for the application which requires a greater amount of bandwidth relative to the low performance data
store the high performance data in the high performance partition and the low performance data in the low performance partition;
receive a request to decrease power; and
in response to the decrease power request, reduce an amount of power to the high performance partition while maintaining an amount of power provided to the low performance partition.

14. The non-transitory machine-readable storage medium of claim 13, wherein the high performance partition has a first type of memory architecture and the low performance partition has a second type of memory architecture.

15. The non-transitory machine-readable storage medium comprising the instructions of claim 13, wherein if executed cause the processor additionally to: copy the high performance data from the high performance partition to the low performance partition.

16. The non-transitory machine-readable storage medium of claim 13, further comprising instructions executable to:
in response to the decrease power request:
identify a frame including visual data from the high performance data; and
store the frame from the high performance data in the low performance partition for display of the visual data on a display of a computing device; and
in response to a request to increase power:
increase an amount of power to the high performance partition to which power was reduced in response to the decrease power request, and
restore the frame from the low performance partition to the high performance partition.

17. An apparatus, comprising:
means for partitioning a volatile memory into a high performance partition and a low performance partition, the high performance partition providing a higher data rate than a data rate of the low performance partition;
means for retrieving an application from a non-volatile memory;
means for separating data for the application into high performance data and low performance data, wherein:
a size of each of the high performance data and the low performance data is less than a size of the data for the application, and
the high performance data includes a portion of the data for the application which requires a greater amount of bandwidth relative to the low performance data;
means for placing the high performance data in the high performance partition and the low performance data in the low performance partition;
means for receiving a request to decrease power; and
means for, in response to the decrease power request, reducing an amount of power to the high performance partition and maintaining an amount of power provided to the low performance partition.

18. The apparatus of claim 17, wherein the means for reducing the amount of power to the high performance partition comprises means for copying the high performance data from the high performance partition to the low performance partition.

19. The apparatus of claim 18, further comprising:
means for receiving a request to increase power;
means for, in response to the increase power request, restoring the high performance data to the high performance partition from the low performance partition.

\* \* \* \* \*